Patented Aug. 11, 1953

2,648,680

UNITED STATES PATENT OFFICE 2,648,680

PROCESS FOR THE PRODUCTION OF ESTERS OF CYCLIC ACETALS

John David Brandner, Wilmington, Del., assignor to Atlas Powder Company, Wilmington, Del., a corporation of Delaware No Drawing. Application March 30, 1951, Serial No. 218,556

8 Claims. (Cl. 260—340.7)

This invention relates to a chemical process. More specifically it relates to a novel chemical process for the preparation of a fatty acid ester of an alkylol substituted cyclic acetal.

It is the object of this invention to provide an improved process for the preparation of a higher fatty acid ester of alkylol substituted 1,3-dioxolanes and alkylol substituted 1,3-dioxanes.

The preparation of cyclic acetals of the 1,3-dioxolane and 1,3-dioxane types by the reaction of aldehydes and ketones with polyols in the presence of an acid catalyst is well known. This condensation has been performed in the presence of such materials as hydrochloric acid, hydrobromic acid, p-toluenesulfonic acid and such salts as calcium chloride, boron chloride, zinc chloride, ferric chloride, ammonium chloride, and sodium bisulfate. Furthermore, esters of alkylol substituted cyclic acetals have been prepared and two processes are described by Marple in United States Patent No. 2,312,298. It was his experience that conventional esterification reactions were not satisfactory when applied to the alkylol substituted cyclic acetals. The acidity of the catalysts caused decomposition of the acetal structure and resulted in very low yields of mono ester of the acetal. This difficulty was overcome by Marple by removing the water of condensation as rapidly as it was formed via an azeotropic distillation. Another process for the preparation of the same type compound is described in this patent whereby the alkylol substituted cyclic acetal is esterified with an acid anhydride in the presence of an alkaline catalyst.

In accordance with the present invention it has been found that in the preparation of higher fatty acid esters of alkylol substituted 1,3-dioxolanes and alkylol substituted 1,3-dioxanes increased yields and decreased reaction times are possible by esterifying with the higher fatty acids in the presence of an alkaline catalyst while removing water of condensation substantially as rapidly as it is formed by use of an azeotropic distillation.

It has been discovered that the reaction may be applied generally to any alkylol substituted 1,3-dioxolane or alkylol substituted 1,3-dioxane. By the term "alkylol" is meant a hydroxy substituted aliphatic radical. This radical may contain one or a plurality of hydroxyl groups. Such compounds as alkylol-1,3-dioxolane formed by the reaction of formaldehyde with a polyol containing three or more hydroxyls, alkylol-2-alkyl-1,3-dioxolane formed by the reaction of a higher aliphatic aldehyde with a polyol containing three or more hydroxyls and alkylol-2,2-dialkyl-1,3-dioxolane such as is formed by the condensation of a dialkyl ketone with a polyol containing three or more hydroxyls, alkylol-2,2-pentamethylene-1,3-dioxolane formed by the reaction of a carbocyclic ketone with a polyol containing three or more hydroxyls, alkylol-2-aryl-2-alkyl-1,3-dioxolane formed from a mixed aryl-alkyl ketone and a polyol containing three or more hydroxyls, alkylol-2,2-diaryl-1,3-dioxolane formed from the reaction of a diaryl ketone with a polyol containing three or more hydroxyls and other aldehyde-polyol addition products such as the benzylidene derivatives and others formed using ketones such as quinone may be used. The 1,3-dioxane structures corresponding to the 1,3-dioxolane compounds listed above may also be employed.

The acids which may be employed include all of the long chain fatty acids and mixtures of fatty and rosin acids. Those fatty acids containing 11 to 20 carbon atoms are preferred. Among these may be mentioned hendecanoic, lauric, myristic, palmitic, stearic, arachidic, oleic, linoleic and the like. Furthermore, mixtures of fatty acids such as those obtained by the saponification of natural fats and oils may be used as well as mixtures of fatty and rosin acids such as occur in tall oil.

The reaction is conveniently performed by refluxing the alkylol substituted cyclic acetal and higher fatty acid in the presence of an alkaline catalyst and a solvent capable of removing water of condensation by azeotropic distillation. Pressures higher or lower than atmospheric may be employed frequently with the advantages of facilitating condensation and/or improving the removal of water formed in the reaction mixture. Atmospheric pressure is generally satisfactory. Water immiscible solvents which are suggested for azeotropic water removal include toluene, xylene, methylisobutyl ketone, methylethyl ketone, isopropyl ether and cyclohexanone. Frequently, the ketone used in forming the acetal is convenient in this role.

Among catalysts suggested for the process may be mentioned sodium hydroxide, potassium hydroxide, or the salts of strong alkalies and weak acids such as sodium acetate and sodium oleate. Normally, it is convenient to use the alkali salt of the acid which is being esterified. This salt may be formed in situ or it may be prepared separately and added as the soap. As little as 0.2% soap based on total charge has been found effective. Larger amounts may be employed. As much as 1% has been used satisfactorily.

The following examples are cited to illustrate the invention. They are not intended to limit it in any manner.

Example I

A three-necked, round bottom, flask equipped with two Barrett receivers, and automatic stirrer is charged with 1620.0 grams (9.31 mols) of 2-methyl-2-isobutyl-4-methylol-1,3-dioxolane, and 1890.0 grams (6.65 mols) of stearic acid, 20.7 grams (0.5% based on total charge) of 85% phosphoric acid and 80.0 grams of methylisobutyl ketone. In this reaction an acid catalyst is employed and the procedure of Marple, above, followed as closely as possible. After 7 hours the reaction slows to an impractical rate. The yield of the stearic acid ester of the acetal charged boiling at 189° C. under 0.05 mm. pressure is 27.8% based on the stearic acid charged.

*Example II*

The procedure of Example I is followed employing the same reactants in the same weight but substituting 7.0 grams of sodium hydroxide pellets as catalyst in place of phosphoric acid employed in Example I. 80.0 grams of methylisobutyl ketone is again used to assist in azeotropic removal of the water formed. At the end of 7 hours there is obtained a yield of 52.6% of the stearic acid ester of the cyclic acetal charged based on stearic acid charged minus that used in soap formation.

Examples III to VIII are carried out in a manner identical to that employed in Examples I and II. The charge weights, the reaction times, and the yields obtained are indicated below:

| Example | Charge | Weight |
|---|---|---|
| III | 2-methyl-2-isobutyl-4-methylol-1,3-dioxolane.<br>Stearic acid<br>NaOH pellets<br>Xylene<br>Reaction time: 5 hours | 837.0 g. (4.81 mols).<br>1,275.0 g. (4.48 mols).<br>19.8 g. (0.9%).<br>80 g.<br>Yields: 63.0%. |
| IV | 2,2-dimethyl-4-methylol-1,3-dioxolane.<br>Stearic acid<br>NaOH pellets<br>Xylene<br>Reaction Time: 11.5 hours<br>Boiling point of product: 213° C. under 3.0 mm. pressure. | 316.0 g. (2.4 mols).<br>594 g. (2.11 mols).<br>4.4 g. (0.42%).<br>130.0 g.<br>Yield: 78.5%.[1] |
| V | 2-methyl-2-ethyl-4-methylol-1,3-dioxolane.<br>Stearic acid<br>NaOH pellets<br>Xylene<br>Reaction Time: 9.5 hours<br>Boiling point of product: 198° C. under 0.6 mm. pressure. | 350.4 g. (2.4 mols).<br>594.0 g. (2.11 mols).<br>4.4 g. (0.41%).<br>130 g.<br>Yield: 80.2%.[1] |
| VI | 2-n-propyl-4-methylol-1,3-dioxolane.<br>Stearic Acid<br>NaOH pellets<br>Xylene<br>Reaction Time: 6 hours<br>Boiling point of product: 184° C. under 0.15 mm. pressure. | 178 g. (1.2 mols).<br>298 g. (1.05 mols).<br>2.3 g. (0.4%).<br>56 g.<br>Yield: 87.7%.[1] |
| VII | 2,2-pentamethylene-4-methylol-1,3-dioxolane.<br>Stearic acid<br>NaOH pellets<br>Cyclohexanone<br>Reaction Time: 3½ hours | 1,033.0 g. (6 mols).<br>1,420.0 g. (5 mols).<br>12.3 g. (0.5%).<br>284.0 g.<br>Yield: 65.7%.[1] |
| VIII | 2,2-pentamethylene-5-methyl-5-hydroxymethyl-1,3-dioxane.<br>Oleic acid<br>NaOH pellets<br>Xylene<br>Reaction Time: 6½ hours<br>Boiling point of product: 213° C. under 0.15 mm. pressure. | 240 g. (1.2 mols).<br>296 g. (1.05 mols).<br>2 g. (0.5%).<br>80 g.<br>Yield: 67.5%. |

[1] Based on acid charged minus that used in soap formation.

Many other modifications will be apparent to those skilled in the art without a departure from the inventive concept.

What is claimed is:

1. A process for the preparation of a higher fatty acid ester of a hydroxyl bearing cyclic acetal which comprises esterification of a hydroxyl bearing cyclic acetal with a higher fatty acid in the presence of an alkaline catalyst.

2. The process as described in claim 1 wherein the cyclic acetal is a 1,3-dioxolane.

3. The process as described in claim 1 wherein the cyclic acetal is a 1,3-dioxane.

4. The process as described in claim 1 wherein the alkaline catalyst is a soap.

5. A process for the preparation of a higher fatty acid ester of a hydroxyl bearing cyclic acetal which comprises esterification of a hydroxyl bearing cyclic acetal with a higher fatty acid in the presence of an alkaline catalyst while azeotropically removing the water of condensation substantially as rapidly as it is formed.

6. A process for the preparation of a higher fatty acid ester of a hydroxyl bearing cyclic acetal which comprises esterification of a hydroxyl bearing cyclic acetal with a fatty acid containing from 11 to 20 carbon atoms, in the presence of an alkaline catalyst, while azeotropically removing the water of condensation substantially as rapidly as it is formed.

7. The process as described in claim 6 where the fatty acid is stearic acid.

8. The process as described in claim 6 where the fatty acid is oleic acid.

JOHN DAVID BRANDNER.

References Cited in the file of this patent

UNITED STATES PATENTS

| Number | Name | Date |
|---|---|---|
| 2,014,310 | Carruthers | Sept. 10, 1935 |
| 2,118,506 | Graves | May 24, 1938 |
| 2,275,467 | Pollack et al. | Mar. 10, 1942 |
| 2,312,298 | Marple | Feb. 23, 1943 |
| 2,411,136 | Luce | Nov. 12, 1946 |